United States Patent [19]
Harrelson, III

[11] Patent Number: 5,806,858
[45] Date of Patent: Sep. 15, 1998

[54] COMPACT FIVE RING STUFFING BOX PACKING ASSEMBLY

[75] Inventor: Albert L. Harrelson, III, Marion, N.Y.

[73] Assignee: Garlock, Inc., Palmyra, N.Y.

[21] Appl. No.: 620,406

[22] Filed: Mar. 22, 1996

[51] Int. Cl.$^6$ ...................................................... F16J 15/24
[52] U.S. Cl. ........................... 277/537; 277/531; 277/539; 277/548
[58] Field of Search ..................................... 277/117, 123, 277/124, 125, 227, 230, 531, 535, 537, 539, 548

[56] References Cited

U.S. PATENT DOCUMENTS

| | | | |
|---|---|---|---|
| 4,256,317 | 3/1981 | Havens et al. ........................... | 277/124 |
| 4,298,562 | 11/1981 | Latty ........................................ | 277/227 |
| 4,328,974 | 5/1982 | White et al. ............................. | 277/115 |
| 5,225,262 | 7/1993 | Leduc ....................................... | 277/230 |
| 5,228,701 | 7/1993 | Greinke et al. .......................... | 277/123 |
| 5,370,405 | 12/1994 | Ueda ........................................ | 277/227 |

*Primary Examiner*—Daniel G. DePumpo
*Attorney, Agent, or Firm*—Cummings & Lockwood

[57] ABSTRACT

The compact five ring stuffing box packing assembly includes high density metal inserted braided end rings of graphite which have each been die formed to have angled facing surfaces. Three low density graphite preform rings having angled facing surfaces are contained between the high density braided end rings. The facing surfaces of the preform rings extend at a different angle relative to the longitudinal axis of the packing assembly than do the facing surfaces of the braided end rings. The braided end rings provide a support function for the preform rings as well as a stem wiping function.

14 Claims, 1 Drawing Sheet

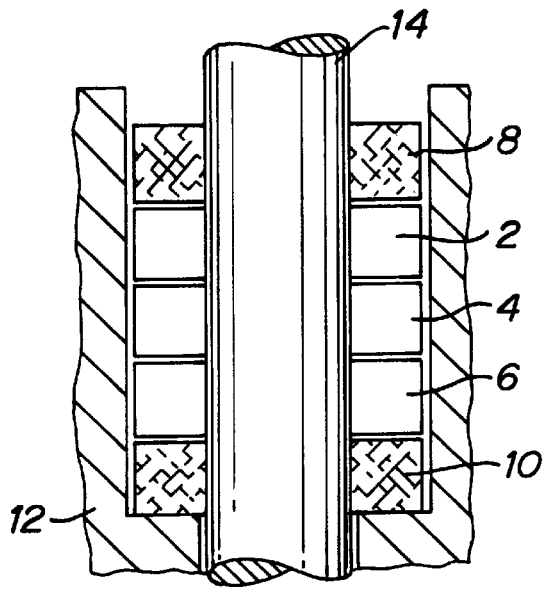
FIG_1 PRIOR ART
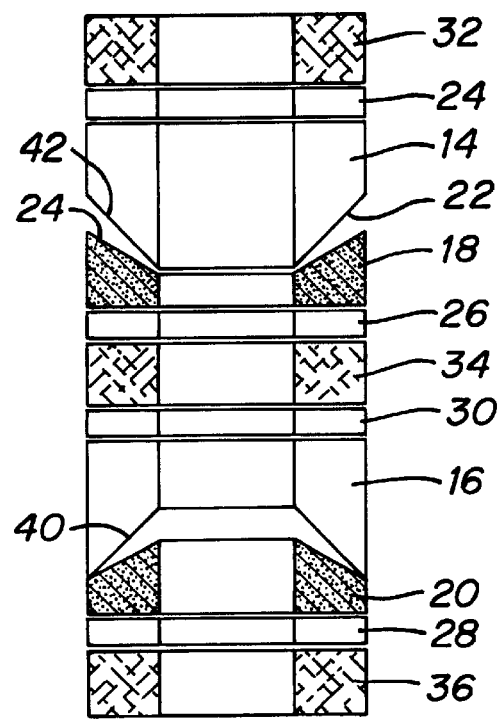
FIG_2 PRIOR ART
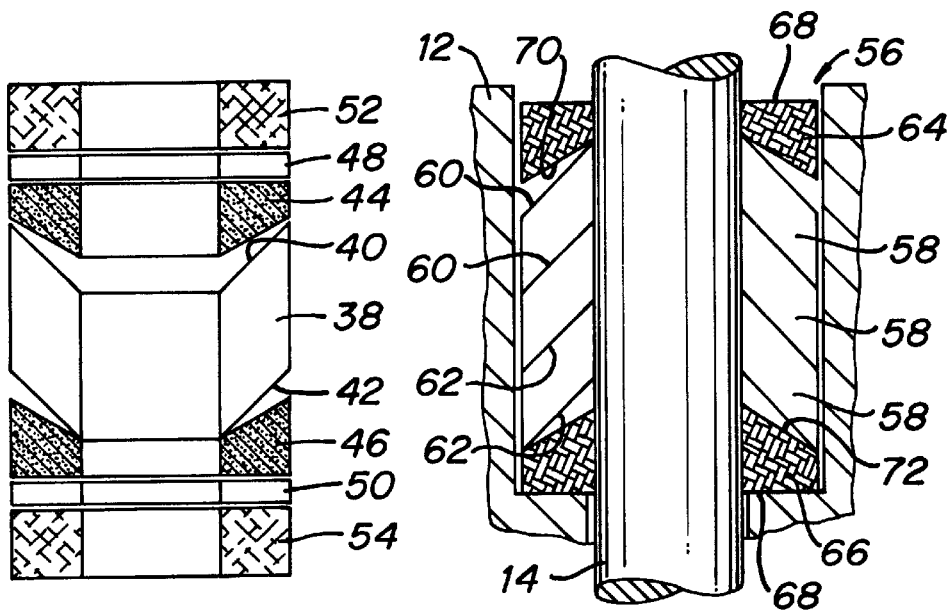
FIG_3 PRIOR ART
FIG_4

COMPACT FIVE RING STUFFING BOX PACKING ASSEMBLY

TECHNICAL FIELD

The present invention relates generally to stuffing box packing assemblies for valve stems, shafts and piston rods, and more particularly to a high density compact five ring stuffing box packing assembly.

BACKGROUND ART

In the past, the five-ring stuffmg box packing assembly shown in cross section in FIG. 1 has been used in stuffing boxes for valves where high performance results are not required. This five-ring stuffmg box packing assembly is a flat combination set consisting of three graphite die-formed tape rings 2, 4 and 6 placed together in the center of the set with braided end-rings 8 and 10 being positioned at the top and bottom of the five-ring set. These five rings are mounted in a stuffing box 12 for sealing a valve stem 14. Graphite die-formed tape rings are low density rings formed from flexible graphite tape which are deformed against the stuffing box or valve stem when a gland (not shown) is tightened. These graphite die-formed tape rings are typically produced at a density of about 1.1 g/cc. 0.7 g/cc density is the lowest flexible graphite tape density that a manufacturer can purchase to produce flexible graphite tape rings. A 0.7 g/cc finished ring is simply a spiral wrapping of the 0.7 g/cc flexible graphite tape with the tape ends adhered in place. In many cases, these rings must be split to facilitate installation into a valve stuffing box. If the ring is a spiral wrapping only of flexible graphite tape, cutting through one side of a ring to enable it to be slipped around a valve stem causes the individual tape wrappings to delaminate and separate. However, if the spiral wrapping of tape is compressed in a die-forming operation under a comparatively low amount of pressure, the tape wrappings form an accordion fold-type bond between the individual layers that enables the rings to be easily split and handled for installation purposes. Compression of the tape in the die forming operation increases the density of the die formed ring to a level above 0.7 g/cc, normally about 1.1 g/cc.

Flexible graphite has a negative functional attribute in that it will extrude through fine clearances as a result of heavy compressive forces. To control and prevent extrusion, the anti-extrusion braided end rings 8 and 10 are placed outside the flexible graphite rings 2, 4 and 6. These braided end rings are often formed from a soft carbon fiber braided packing material.

The five-ring "flat" combination set arrangements are very simple to assemble. All components are square in cross-sectional shape, and it is a well known principle in industry that the three graphite die-formed tape rings are placed together in the center of the set with the braided end-rings being positioned at the top and bottom ends. As a result of the widespread use of the five-ring flat combination set, many valve designs in the industry are adapted for use with a stuffing box depth sufficient to accommodate only the five packing ring cross sections of the five ring flat combination. This stuffing box depth is presently the predominant market trend.

Although the flat, five ring stuffing box packing assembly is simple to manufacture and install, it has limitations in expansion efficiency, resistance to abrasive damage caused by stem scale build up, valve stem friction and sealability properties.

The stuffing box packing system of U.S. Pat. No. 4,328,974 to Richard E. White et al. was developed to provide enhanced radial expansion and sealability characteristics for valves, such as petrochemical and power industry valves where high performance results are required. This eleven ring set, shown in cross section in FIG. 2, incorporates uniquely designed low density graphite Preform rings 14 and 16 mated to higher density graphite Adapter rings 18 and 20 in such a way that one pair of these rings has its radial expansion properties oriented toward the outside sealing surface, and the other pair of rings is likewise oriented toward the inside sealing surface. The Adapter and Preform rings are composed of flexible graphite tape layered in either a spiral-wrapped or a laminated format before die-forming. The adjacent mating face surface angles 22 and 24 of the Preform and Adapter rings are typically 45° and 60° respectively. The combination effect of mating differing density material at differing angles is to enhance the radial expansion characteristics of the set. This enhanced radial expansion ability enables a single set to cover a wider range of cross-sectional stuffing box clearances than would be possible with more conventional designs, and the enhanced expansion ability also leads to a higher degree of sealing efficiency.

The Preform and Adapter rings are composed of graphite, usually and typically of the flexible graphite tape material type. The Preforms have a density range of 0.5 to 1.4 g/cc. The Adapter rings have a density range of 1.4 to 1.7 g/cc. The remaining seven rings are present to provide important supporting functions. The four metal on GYLON® spacer rings 24, 26, 28 and 30 ensure that loading forces are distributed evenly around the compression surfaces of the paired Preform and Adapter rings. The three braided rings 32, 34 and 36, positioned at the top, the center, and in the bottom of the set, are present to perform collectively as resiliency rings, antiextrusion rings, and wiper rings. The braided rings are compressible carbon or graphite braided material.

U.S. Pat. No. 4,328,974 also discloses an alternate seven ring set shown in cross section in FIG. 3. The principal difference of the seven ring set from the eleven ring set of FIG. 2, is that the Preform rings 14 and 16 have been combined into a single, reduced height Preform ring 38 which contains both the OD and ID angled face features 40 and 42 respectively of the Preform rings 14 and 16. The consolidation of the two Preform rings of FIG. 2 into the single ring 38 eliminates the need for two of the spacer rings and one of the braided rings of FIG. 2. Thus, in addition to the Preform ring 38, the seven ring set has two flexible graphite Adapter rings 44 and 46, two spacer rings 48 and 50, and two compressible braided carbon or graphite rings 52 and 54. The seven ring set of FIG. 3 can be used to seal valves that have shallower stuffmg boxes than would be possible with eleven ring sets. This feature, however, was obtained with a compromise in sealing effectiveness. The reduced amount of Preform ring material also reduces the seven ring set's comparative sealing effectiveness.

The eleven and seven ring sets of U.S. Pat. No. 4,328,974, in side-by-side comparative functional testing with the flat five-ring set of FIG. 1, have proven to be the best functional product for use in critical process valves where leakage could lead to significant process unit down-time or environmentally hazardous conditions. However, the complexity, cost, set height and installation requirements of the eleven and seven ring sets have proven disadvantageous.

DISCLOSURE OF THE INVENTION

It is a primary object of the present invention to provide a novel and improved compact five ring stuffing box packing assembly adapted for a one step installation and compression procedure in a five ring stuffing box.

Another object of the present invention is to provide a novel and improved compact five ring stuffing box packing assembly having enhanced sealability and radial expansion capabilities which adapts the assembly for use in valves where high performance results are required.

Yet another object of the present invention is to provide a novel and improved compact five ring stuffing box packing assembly having high density, metal-inserted, braided end rings having a high resistance to extrusion and abrasion.

A further object of the present invention is to provide a novel and improved compact five ring stuffing box packing assembly having high density braided end rings with a density greater than 1.8 g/cc.

A still further object of the present invention is to provide a novel and improved compact five ring stuffing box packing assembly having high density metal inserted braided end rings of graphite which have each been die formed to have angled facing surfaces. Three low density graphite perform rings having angled facing surfaces are contained between the high density braided end rings. The facing surfaces of the preform rings extend at a different angle relative to the longitudinal axis of the packing assembly than do the facing surfaces of the braided end rings. The braided end rings provide a support function for the preform rings as well as a stem wiping function.

BRIEF DESCRIPTION OF THE DRAWINGS

FIG. 1 is a cross sectional view through a stuffing box, stem and a flat five ring stuffing box packing assembly of the prior art;

FIG. 2 is a cross sectional view of a prior art eleven ring stuffing box packing assembly of the prior art;

FIG. 3 is a cross sectional view of a prior art seven ring stuffing box packing assembly of the prior art; and FIG. 4 is a cross sectional view through a stuffing box, stem and a five ring stuffing box packing assembly of the present invention.

DETAILED DESCRIPTION OF THE PREFERRED EMBODIMENT

With reference to FIG. 4, the compact five ring stuffing box packing assembly 56 of the present invention is shown mounted in the five ring stuffing box 12 of FIG. 1. As in the seven ring unit of FIG. 3, the five ring stuffing box packing assembly 56 includes three die formed flexible graphite tape, low density Preform rings 58 having a density within a range of from 0.5 to 1.4 g/cc. These Preform rings can be separate rings, as shown, each having opposed outer surfaces 60 and 62 that extend at the same acute angle to the longitudinal axis of the stuffing box packing assembly 56 along which the valve stem 14 extends. Alternatively, the single Preform ring 38 of FIG. 3, which is three rings in height, can be substituted for the three Preform rings 58. When the three Preform rings 58 are used, the three rings nest, and the outermost surfaces 60 and 62 of the two end rings form ID and OD angled face features respectively for the Preform ring assembly. Thus the outermost surface 60 extends at an acute angle to the longitudinal axis of the packing in the axially inner direction and the outermost surface 62 extends at an acute angle to the longitudinal axis of the packing in the axially outer direction, both at an angle of about 45 degrees.

With the prior art packing sets of FIGS. 2 and 3, it was found to be desirable to maintain as wide a difference as possible in the densities of the Preform rings and Adapter rings. The differing densities, along with the differing angles of these two component parts, is the source of the enhanced sealability and radial expansion capabilities of the set. As the set is compressed, the Preforms will expand to form a seal, but this compression also necessarily increases the density of the Preform ring components themselves. The enhanced radial expansion and sealability properties will continue to occur as a result of later applied compressions until such time that the density of the Preform ring has attained and matched the density level of the Adapter ring. At this point, when the Preform and Adapter ring densities are the same, the set will continue to function only comparably to the conventional combination flat-ring set of FIG. 1. To enhance the performance and increase the service life of the prior art packing sets of FIGS. 2 and 3, the Preform density value was adjusted to a typical value of 1.1 g/cc and the Adapter ring densities were adjusted to a maximum value of 1.7 g/cc. An Adapter ring density of 1.7 g/cc represents the maximum practical density limit that flexible graphite tape can be compressed to attain in a die-formed ring form.

To achieve the five ring stuffing box packing assembly 56 of the present invention, it was necessary to perform the functions of the Adapter rings 44 and 46, the support functions of the spacer rings 48 and 50 and the wiper functions of the compressible braided carbon or graphite rings 52 and 54 of FIG. 3 with only two additional rings. It was found that metal-inserted conformable braided stock (hereafter referred to as MIC-braid) composed (preferably) of pure flexible graphite tape, into which has been inserted or included strips, wires, filaments, tinsels, etc., of metal. While MIC braid with Inconel (TM) metal inserts of the type sold as packing 1303 by Garlock Industrial Packing Products, Sodus, N.Y. is the most favored choice, other metallic insert choices (such as steel, copper, brass, aluminum, zinc, etc.) can be used as well. Due to the metallic inserts, the MIC-braids are unusually versatile in being able to be die-formed into various shapes, sizes, angles, etc. The metal inserts rigidly hold and conform the finished die-formed MIC-braid rings into virtually any desired shape.

Die-forming trials were conducted to determine the maximum density that MIC-braided rings could be produced to attain. The results demonstrated that MIC-braid die-formed rings were possible having a density as high as 2.60+ g/cc, much higher than the maximum 1.7 g/cc density attainable with graphite tape Adapter rings. The three Preform rings 58 (having a combined stack height of three cross-sections) are a necessary part of maintaining the high performance levels desired for the packing assembly 56. The Preforms must have a shaped ring on either end to develop the enhanced radial expansion flow of the Preform ring material during compression. However, it is also necessary to provide rigid support for the Preforms, and finally, compressible braided carbon or graphite end-rings are also a necessary component in that they preform anti-extrusion and wiping functions. To provide two end rings 64 and 66 having all of these attributes, the end rings are MIC braids using graphite in tape form. One of the benefits of using graphite in tape form is that, when die-formed, it presents a smooth low-friction surface for mating contact. When the end ring's high density 60° surface 68 contacts the Preform ring's low density 45° surface under a heavy compressive loading force, the end ring's surface must be smooth and relatively slippery to encourage the outward or inward sliding and slippage of the soft Preform material. If the end ring surface had the rougher surface texture that is common with most conventional die-formed braided forms, the resultant friction would eliminate most of the expansion qualities of the set. The contact between the rough end ring surface and the Preform material would hold the Preform material at its contact point and bind it up.

Since radial expansion is the primary function of the Preform rings 58, the rigidity of the die-formed MIC-braided rings is not a disadvantage at all, but is, in fact, an advantage. Being very rigid, these end rings will remain unaffected by compressive loading forces, and will maintain a smooth 60° contact surface to a better degree than would be possible with conventional flexible graphite tape Adapters, and will provide support for the Preform rings. Each end ring 64 and 66 is die-formed with an outer surface 68 which extends at approximately a 90 degree angle to the longitudinal axis of the packing and a 60 degree angled inner surface. The inner surface 70 of the end ring 64 extends at an acute angle of about 60 degrees to the longitudinal axis of the packing and operates with the angled surface 60 of the top Preform ring to form the ID angled face feature. Similarly, the inner surface 72 of the end ring 66 extends at an angle of about 60 degrees to the longitudinal axis of the packing and operates with the angled surface 62 of the bottom Preform ring to form the OD angled face feature. The metal component in the MIC-braided end rings cause the end rings to hold their shape when subjected to compression by a packing gland (not shown), and as previously discussed, the greater the density range between the density of the end rings 64 and 66 and the Preform rings 58, the greater the range of enhanced radial expansion and sealability properties for the packing assembly 56.

While the MIC-braid forming the end rings 64 and 66 has a significant flexible graphite content and has the smooth surface finishes that are characteristic of pure flexible graphite die-formed tape rings, its metal-inserted braided structure ensures that the ring resists extrusion. The MIC-braided material is also an unusually effective wiper ring material. Flexible graphite tape material has an affinity to attach itself in particle form to metal surfaces. If a wiper ring is not positioned above and below the Preform rings, particles of graphite would attach itself to the stem 14 and be transported out of the stuffing box as the stem is actuated to its opened and closed positions. The resultant volume loss in the flexible graphite Preform rings would quickly lead to the development of leakage paths through the set. In testing conducted to date, the MIC-braided end-rings have shown the capability to keep the stem wiped entirely clean.

The metal insert material in the MIC-braided end rings acts a non-abrasive scraper on the valve stem surface. In some field applications, the media or outside environment creates a scale build-up on the metal stem surface. These applications are especially difficult to seal successfully due to the cutting properties of this scale as the valve stem is actuated through the packing set. This scale/debris build-up easily slices grooves through conventional compressible braided carbon or graphite end-rings. However, the inherent abrasion resistance and toughness of the MIC-braided end rings 64 and 66 removes scale and resists the grooving action of scale.

The five ring stuffing box packing assembly 56 of FIG. 4 has been tested by a number of methods that serve to indicate that it provides significant advantages over the prior art packing assemblies.

1) Comparative Standard Emission Testing

This test involves subjecting the packing set to a valve functional test where the media exposure is 750° F./500 psi Helium. The stem 14 is cycled through 500 complete actuations/day for a period of three days. The hot test period or thermal cycle is experienced for six hours of each day—yielding a total of three thermal cycles. This test procedure is a very difficult test of a product's finctional performance capabilities. The following are the results from testing conducted on the conventional seven-ring set (FIG. 3), the five-ring packing assembly 56 (FIG. 4), and a five-ring flat combination-type set (FIG. 1).

| Style | Average Stem Friction Forces | Adjustments | Maximum Leakage | Installation Steps | Gland Load (psi) |
|---|---|---|---|---|---|
| 7 ring (FIG. 3) | 658 | 0 | 0 ppm | 2 | 3800 |
| 5 ring 56 (FIG. 4) | 519 | 0 | 0 ppm | 1 | 3800 |
| 5 ring Flat (FIG. 1) | 1014 | 1 | 800 ppm | 2 | 3800 |

All three of the above products were compressed under the same gland loading forces (3800 psi) so that performance comparisons could be drawn. The prior art seven-ring set and the five-ring flat conventional combination-type set were installed using two-step installations. A two-step installation yields the best performance, but consumes a greater amount of time. The new five-ring set 56 used a one-step procedure for installation. Both set designs of FIGS. 3 and 4 had 0 ppm leakage detectable throughout the test procedure, while the five-ring flat combination-type set of FIG. 1 had seven (7) leakage points detected with a maximum leakage level recorded of 800 ppm. Neither the set of FIG. 3 or the five ring set of FIG. 4 required any follow-up adjustments during the test, while the five-ring flat combination-type set of FIG. 1 required two adjustments to maintain leakage levels below the 500 ppm goal (Clean Air Act legislation limit). A measurement of the stem frictional forces, which is of critical concern to the control valve industry, showed that the five-ring set 56 had a 21.2% lower average friction than the seven-ring set of FIG. 3 and 48.8% less friction than the five-ring conventional combination set design of FIG. 1.

Summary: The five-ring design 56 of the present invention (with metal-inserted conformable braided end rings 64 and 66) matched the seven-ring sets sealability performance, and significantly outperformed the five-ring conventional set's performance. The five-ring design 56 also significantly outperformed both of the other designs in its lower stem friction results.

3800 psi is the minimal amount of gland loading required to get favorable results in emission testing exercises with the prior art seven and eleven ring sets and with the conventional prior art combination five-ring flat sets. The compressible braided carbon or graphite fiber end-rings that are normally used with the prior art sets are relatively soft and flexible. When compressed in a valve stuffing box, the applied gland loading forces quickly cause these compressible braided end-rings to expand where they come into firm contact against the stem and box bore surfaces. As the loading forces increase to 3800 psi, the top braided compressible end-ring develops a strong frictional grip on the valve stem surface. This frictional grip prevents some of the loading forces from being effectively transmitted down through the end-ring to the sealing rings located in the center of the set.

The MIC-braid, die-formed into a high density end ring 64 or 66 does not have the soft resiliency of compressible braided carbons. While the end rings 64 and 66 will form a contact sufficient to act as an effective wiper/anti-extrusion ring, the MIC-braided ring is much too rigid to create a hard frictional grip against the stem surface as a result of heavy applied loads. The lack of frictional grip means that a greater percentage of the gland loading forces are efficiently transferred to the primary sealing rings (Preforms 58) located in the center of the set. To provide this theory, the five-ring set 56 with its MIC-braided end rings should be able to attain a less than 500 ppm seal at lower gland loading pressures.

An emission test was conducted, under the same service conditions stated previously, but with only 3000 psi gland loading. The results were:

| Style | Average Stem Friction Forces | Adjustments | Maximum Leakage | Installation Steps | Gland Load (psi) |
|---|---|---|---|---|---|
| 5 ring 56 (FIG. 4) | 481 lbs. | 0 | 350 ppm | 1 | 3000 |
| 7 ring (FIG. 3) | 650 lbs. | 1 | 1300 ppm | 2 | 3000/ 4038* |

* = Initial/Final (After Adjustment)

The five-ring set 56 with the MIC-braided end rings was able to more efficiently transfer the gland loading forces through the end ring to the Preform sealing rings. Its maximum leakage point was 350 ppm—well under the 500 ppm level dictated by the Clean Air Act. No adjustments were required, and a one-step installation procedure was followed. The seven-ring prior art set, installed with the superior two-step installation method and with the same 3000 psi gland loading force, had an initial leak of 1300 ppm, and required an adjustment to a gland load of 4038psi to reduce its leakage to a value under 500 ppm. The frictional grip formed by the compressible braided end-rings in the seven-ring set prevented a portion of the 3000 psi initial gland loading force from efficiently reaching the center Preform sealing rings. As a result, the seven-ring set's Preforms did not receive the compression energy required to radially expand and create a seal comparable to that attained with the five-ring MIC-braid set 56. Having fewer rings, and having firm conformable end rings, the five-ring MIC-braided set 56 uses the applied forces more efficiently and effectively.

Stem Friction Comparisons:

The following table provides some basic friction force comparison data on the seven ring set of FIG. 3 and the five ring set of FIG. 4. Breakaway friction is the force required to start the stem moving on the initial stroke. The second column value is the sliding stem friction factor, measured under hot conditions.

| Style | Initial Stem Breakaway Friction Factor | Stem Friction Factor at 750° F./500 psi |
|---|---|---|
| 7-ring set (FIG. 3) | f = 0.08 | f = 0.06 |
| 5-ring set 56 (FIG. 4) | f = 0.075 | f = 0.049 |

As seen in a previous test, the seven-ring set outperforms the five-ring flat-ring combination set of FIG. 1 in frictional performance. This test result shows that the five ring set of FIG. 4 outperforms the seven-ring set in both breakaway (green) and in hot friction.

Density Range Advantages of MIC Versus Flexible Graphite Tape:

The following is a listing of a number of density values, and the corresponding compressive loading forces that are required to reach those values from an initial flexible graphite tape density of 0.7 g/cc (43.7 lbs./ft$^3$).

Flexible Graphite Die-Formed Tape Material

| Density Value Metric (English) | Compressive Loading Force |
|---|---|
| 0.7 g/cc (43.7 lbs/ft$^3$) | 0 psi |
| 1.0 g/cc (62.4 lbs/ft$^3$) | 350 psi |
| 1.1 g/cc (68.6 lbs/ft$^3$) | 750 psi |
| 1.4 g/cc (87.3 lbs/ft$^3$) | 1900 psi |
| 1.5 g/cc (93.6 lbs/ft$^3$) | 2900 psi |
| 1.6 g/cc (99.6 lbs/ft$^3$) | 3650 psi |
| 1.7 g/cc (106.0 lbs/ft$^3$) | 5000 psi |
| 1.8 g/cc (112.3 lbs/ft$^3$) | 5850 psi |
| 1.812 g/cc (113.0 lbs/ft$^3$) | 6000 psi |

The highest free-standing (free of tension caused by being subjected to compressive loading force) density that applicant has ever witnessed with a die-formed flexible graphite tape ring is 1.81 g/cc (113 lbs/ft$^3$). If a die-formed tape ring density of 113 lbs/ft$^3$ is desired, the spiral wrapping of 43.7 lbs/ft$^3$ flexible graphite tape is placed in a mold and compressed under a pressure of approximately 6000 psi. Upon removal, the die-formed tape ring density will be about 113 lbs/ft$^3$. If the tape is die-formed under a higher pressure than 6000 psi, the density of the tape ring will attain a level higher than 113 lbs/ft$^3$ as long as it remains under the influence of the compressive loading force. However, upon removal from the die, the die-formed tape ring will immediately relax back to a density of approximately 113 lbs/ft$^3$. 1.81 g/cc (or 113 lbs/ft$^3$), therefore, becomes a critical limit when designing the densities of Adapter rings using flexible graphite materials. As long as flexible graphite tape is used as the starting raw material for the Adapter ring, the maximum density obtainable is 113 lbs/ft$^3$.

The Preform rings are typically produced at a density of 1.1 g/cc. As mentioned previously, maximizing the density differences between the Preform rings and Adapter rings is critical to maximizing the enhanced radial expansion service life of the packing set. A flexible graphite die-formed tape ring will not start to deform, expand, or compress until it is subjected to a compressive load that exceeds its prior experiences.

For example, if a 1.1 g/cc density Preform ring for the prior art sets of FIGS. 2 and 3 is die-formed under a compressive load of 750 psi, and then combined with the rest of the ring components in a valve stuffing box, the Preform ring will not deform and begin its expansion movement until the gland follower compressive loading forces exceed 750 psi. As soon as 750 psi is exceeded, the ring will being its preferential expansion to either the ID or to the OD, depending upon its design focus.

If the initial seal is acquired as a result of 3650 psi gland loading compressive force, the Preform ring (subjected to the 3650 psi gland load) will be at a density of 1.6 g/cc. If, at a later date, leakage develops and the set needs additional compression, the Preform ring will being to expand and regain a seal as soon as the compressive loading forces that it experiences exceed 3650 psi.

Prior art Adapter rings, die-formed from flexible graphite tape, are typically produced at a density of 1.7 g/cc (106 lbs/ft$^3$). 1.7 g/cc is as close the maximum attainable density level (1.81 g/cc) as possible and practical from a manufacturing stand-point. All flexible graphite rings, in all sizes, can be die-formed to a 1.7 g/cc density; however, attaining the maximum density of 1.81 g/cc in every size on every ring on every production order is not practical. 1.7 g/cc was selected as the maximum density that is routinely achievable for manufacturing consistency. This density level requires a compressive loading force of approximately 5000 psi during the die forming process. The Adapter rings, when combined with other components in a packing set, will not experience any significant deformation or expansion until a loading force of 5000 psi is exceeded.

The gap, or the differences in the densities, that exist between the 1.1 g/cc flexible graphite tape die-formed Preform rings and the 1.7 g/cc flexible graphite tape die-formed Adapters is the maximum that is practically achievable using these raw materials. When a prior art set of FIGS. 2 or 3 is installed in a valve and compressed, the compressive load causes the softer Preform rings to deform and radially expand to form an ID and OD sealing contact with the valve stuffing box surfaces. The differences in densities (1.1 g/cc vs. 1.7 g/cc) and the differences in angles (45° and 60°) enhance the efficiency of this expansion to a point that is several orders of magnitude beyond the expansion efficiency of standard flat combination-type ring set of FIG. 1. As the set is compressed under progressively higher loading forces, the Preform ring angle of 45° will become deformed to match the 60° angle of the Adapters, but the differences in densities will continue to be a property of the set until a gland loading compressive pressure of 5000 psi is reached. At approximately 5000 psi, the density of the Preform rings will match that of the Adapter rings. When the 5000 psi point is reached, the expansion efficiency of these prior art set designs will be reduced to that of a conventional flat-ring combination set of FIG. 1. This 5000 psi efficiency barrier, necessary as a result of the limitations inherent in the use of flexible graphite tape material, has served as a counter to the performance, service life, etc. that could have been otherwise enjoyed by industry if higher density, suitably formed, Adapters were available.

Die-forming trials conducted on the MIC-braided material used in the end rings 64 and 66 of FIG. 4 proved that this braided material form, when die-formed into the end ring configuration, could significantly extend the enhanced expansion range of opposing Preform rings 58 well past the 5000 psi barrier. The following table lists some example density vs. force values for the MIC-braided material that are far beyond the capabilities of flexible graphite die-formed tape rings:

| Density Value Metric (English) | Compressive Loading Force |
|---|---|
| 1.44 g/cc (90 lbs/ft$^3$) | 750 psi |
| 1.68 g/cc (105 lbs/ft$^3$) | 1500 psi |
| 1.84 g/cc (115 lbs/ft$^3$) | 2500 psi |
| 1.96 g/cc (122 lbs/ft$^3$) | 3500 psi |
| 2.12 g/cc (132 lbs/ft$^3$) | 4500 psi |
| 2.18 g/cc (136 lbs/ft$^3$) | 5500 psi |
| 2.22 g/cc (139 lbs/ft$^3$) | 6500 psi |
| 2.28 g/cc (142 lbs/ft$^3$) | 7500 psi |
| 2.32 g/cc (145 lbs/ft$^3$) | 8500 psi |
| 2.36 g/cc (145 lbs/ft$^3$) | 9500 psi |
| 2.40 g/cc (150 lbs/ft$^3$) | 10,500 psi |
| 2.44 g/cc (152 lbs/ft$^3$) | 11,500 psi |
| 2.57 g/cc (160+ lbs/ft$^3$) | 38,000 psi |

As stated previously, the limitation in the enhanced radial expansion capability of the prior art seven and eleven ring sets is due to the density limitation of the flexible graphite tape that is used to produce the Adapter rings. That limitation is 5000–6000 psi. While the Preform rings are capable of a continuance of their enhanced radial expansion capabilities beyond this 6000 psi limit, that continuance is only possible if it is compressed against a material that is densified to a correspondingly higher material value. As shown in the above-MIC Braid Table, MIC braided end rings have the capability of being die-formed to densities as high as 160+ lbs/ft$^3$. In order to attain this density value, compressive loading forces of 38,000 psi are required in die-forming. The compressive loading force value shown for 160+ lbs/ft$^3$ was measured as a result of die-forming 1" 1-½" MIC rings. 1"×1-½" rings have a surface area of 0.982 in$^2$. If this same loading force was applied to a ½"×¾" ring (surface area of 0.245 in$^2$), the effective die-forming pressure would be over 150,000 psi and end ring densities of 170 lbs/ft$^3$ would be attainable. In the case of a 1×1-½ packing set size, against MIC-braided end rings, die-formed to 160 lbs/ft$^3$, the Preform enhanced radial expansion capabilities will be enhanced to cover a compressive loading pressure range of 750 psi to 38,000 psi.

The valve packing system is often the weak link in the service range and service life capabilities of a valve. Even a premium performance valve packing set, like the prior art set of FIG. 3, can not offer enhanced expansion and material flow beyond 6000 psi. With standard Preform rings 58 mated and matched to MIC braided end rings 64 and 66, the five ring stuffing box packing assembly 56 of FIG. 4 can offer enhanced performance features to levels as high as 38,000 psi; well beyond the capabilities of current prior art packing assemblies.

While prior art carbon compressible braided end-rings are less expensive, and have a greater resistance to fracturing damage as a result of heavy applied gland loading forces, than compressible graphite yarn rings, the carbon yarn braids do not have the high temperature exposure resistance of the graphites. The graphite yarn braids can withstand exposures to 1200° F. with little or no detrimental effect, while the carbon yarns will suffer some small deterioration at constant exposures above 1100° F. The graphite yarn braids are considerably more expensive, but will suffer fracturing damage readily at gland loading pressures in excess of 4000 psi. Carbon compressible braids are unaffected by fracturing damage well in excess of 4000 psi.

The end rings 64 and 66 for the five ring stuffmg box packing assembly 56 are Inconel MIC-Braided end-rings composed of pure graphite and Inconel. Their temperature resistance properties are equal to the compressible graphite yarn end-rings, but due to the metal inserts, they have fracture resistance properties in excess of that of the carbon compressible yarn braids. The result is that the packing assembly 56 can withstand elevated temperature/high pressure exposures beyond that of any of the conventionally available packing sets of the prior art.

I claim:
1. A packing for a stuffing box comprising:
   a low density graphite preform ring that is compressible and re-formable during packing installation to form at least one of an ID or OD seal and
   a high density, substantially rigid end ring responsive when axial compressive force is applied to the packing for forcing the material adjacent one radial edge of a first end of the preform ring to move axially and radially in a direction away from the preform ring and for further compressing the material into an impervious and effective seal, the end ring having a first end surface thereof adjacent the first end of the preform ring, the first end of the preform ring having a first surface which faces the first end surface of the end ring with the facing surfaces each extending at an acute angle to the longitudinal axis of the packing and wherein the angles are different, the end ring having a second end surface extending substantially perpendicular to the longitudinal axis of the packing, wherein the end ring is formed from braided graphite tape stock including metal inserts which has been die formed to shape the end ring and impart a density in excess of about 1.8 g/cc thereto.

2. The packing of claim 1 wherein the first end of the preform ring forms an ID seal wherein the acute angles are in the axially inner direction, and wherein the acute angles of the preform and end ring facing surfaces are approximately 45° and 60°, respectively.

3. The packing of claim 1 wherein the end ring has a high resistance to extrusion and abrasion.

4. The packing of claim 1 wherein the end ring both supports the preform ring and wipes a valve stem.

5. The packing of claim 1 further comprising:

three low density graphite perform rings having angled facing surfaces operatively positioned between two high density braided end rings.

6. A packing for a stuffing box comprising:

a low density graphite preform assembly that is compressible and reformable during packing installation to form both an ID and OD seal, the graphite preform assembly having a top end surface and a bottom end surface, both of which extend at an acute angle to the longitudinal axis of the packing, a first high density, substantially rigid end ring adjacent to the top end surface of the preform assembly and responsive when compressive force is applied to the packing for forcing the material of the preform assembly at the top end surface to flow radially and axially and for further compressing the material into an impervious and effective seal, the first end ring having a first end surface adjacent to and facing the top end surface of the preform assembly and extending at an acute angle to the longitudinal axis of the packing which differs from the acute angle of the top end surface of the preform assembly, and a second high density substantially rigid end ring adjacent to the bottom end surface of the preform assembly and responsive when compressive force is applied to the packing for forcing the material of the preform assembly at the second end surface to flow radially and axially and for further compressing the material into an impervious and effective seal, the second end ring having a first end surface adjacent to and facing the bottom end surface of the preform assembly and extending at an acute angle to the longitudinal axis of the packing which differs from the acute angle of the bottom end surface of the preform assembly, the first and second end rings each being formed from braided graphite stock including metal inserts which has been die formed to shape the end rings and wherein the first and second end rings have a density in excess of 1.8 g/cc.

7. The packing of claim 6 wherein the first and second end rings engage the top and bottom surfaces of the preform assembly to provide an ID and an OD seal.

8. The packing of claim 7 wherein an ID seal is provided by the first end surface of one of the first or second end rings in combination with the facing top or bottom surface of the preform assembly, the end ring first surface and preform assembly top or bottom surface forming the ID seal being inclined at an acute angle to the longitudinal axis of the packing int he axially inner direction, and an OD seal is provided by the first end surface of the remaining end ring and the remaining facing top or bottom surface of the preform assembly, the end ring first surface and preform assembly top or bottom surface forming the OD seal being inclined at an acute angle to the longitudinal axis of the packing in the axially outer direction.

9. The packing of claim 8 which includes five rings, the preform assembly including three of the five rings.

10. The packing of claim 9 wherein each of the three preform assembly rings includes a top and a bottom surface extending at substantially the same acute angle from a central opening, the preform assembly rings being stacked between the end rings.

11. The packing of claim 10 wherein the top and bottom surfaces of the preform assembly extend at substantially a 45 degree angle to the longitudinal axis of the packing and the first end surfaces of the first and second end rings extend at substantially a 60 degree angle to the longitudinal axis of the packing.

12. The packing of claim 8 wherein each the end ring is die formed at compressive loading values within a range of from about 750 psi to about 38,000 psi.

13. The packing of claim 8 wherein each the end ring is die formed at compressive loading values within a range of from about 2,500 psi to about 38,000 psi.

14. A packing for a stuffing box comprising a low density graphite preform assembly that is compressible and reformable during packing installation to form both an ID and OD seal, the graphite preform assembly having a top end surface and a bottom end surface, both of which extend at an acute angle to the longitudinal axis of the packing, a first high density, substantially rigid end ring adjacent to the top end surface of the preform assembly and responsive when compressive force is applied to the packing for forcing the material of the preform assembly at the top end surface to flow radially and axially and for further compressing the material into an impervious and effective seal, the first end ring having a first end surface adjacent to and facing the top end surface of the preform assembly and extending at an acute angle to the longitudinal axis of the packing which differs from the acute angle of the top end surface of the preform assembly, and a second high density substantially rigid end ring adjacent to the bottom end surface of the preform assembly and responsive when compressive force is applied to the packing for forcing the material of the preform assembly at the second end surface to flow radially and axially and for further compressing the material into an impervious and effective seal, the second end ring having a first end surface adjacent to and facing the bottom end surface of the preform assembly and extending at an acute angle to the longitudinal axis of the packing which differs from the acute angle of the bottom end surface of the preform assembly, the first and second end rings each being formed from braided graphite stock including metal inserts which has been die formed to shape the end rings,wherein each end ring is die formed at compressive loading values within a range of from about 2,500 psi to about 38,000 psi.

* * * * *